No. 787,756.                                            Patented April 18, 1905.

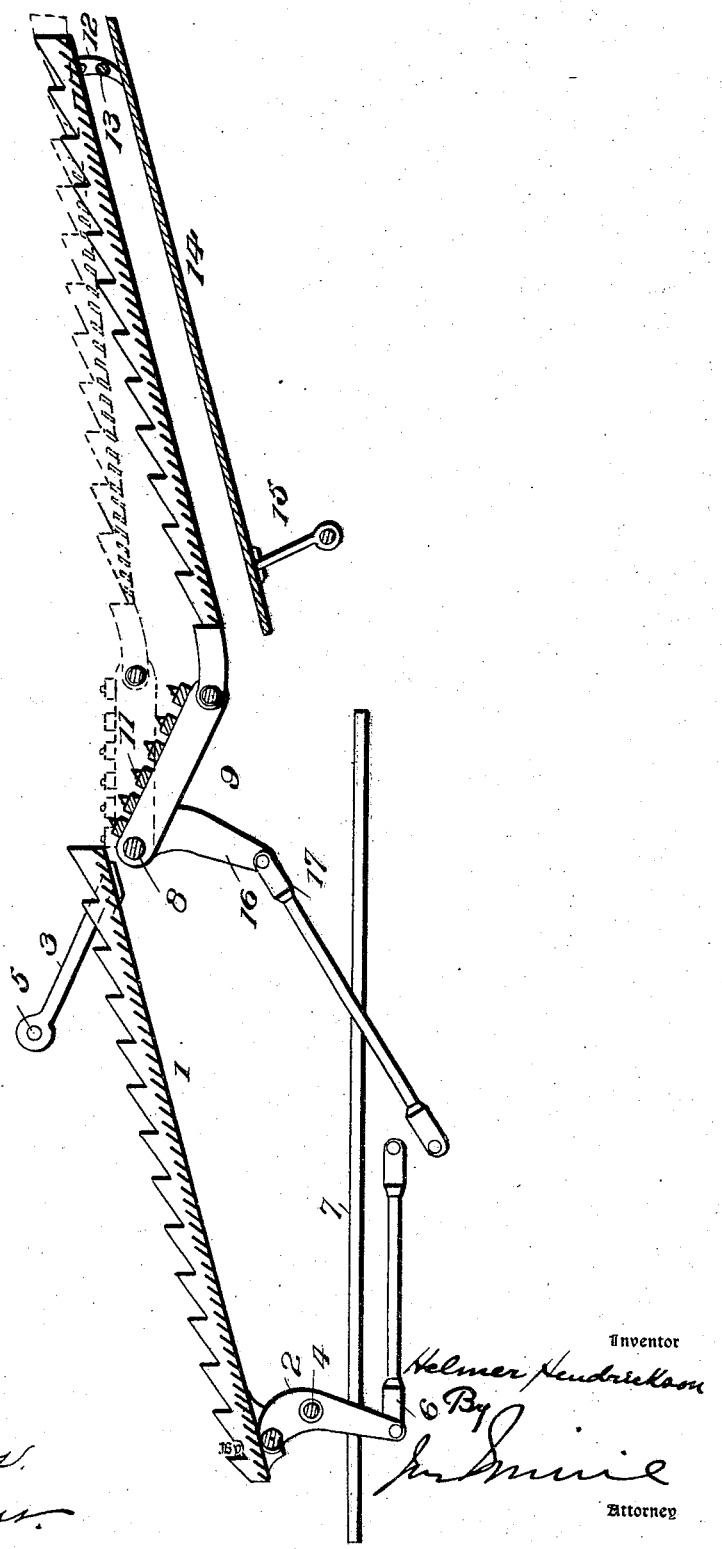

UNITED STATES PATENT OFFICE.

HELMER HENDRECKSON, OF DECORAH, IOWA.

SEPARATING AND THRESHING APPLIANCE.

SPECIFICATION forming part of Letters Patent No. 787,756, dated April 18, 1905.

Application filed June 22, 1904. Serial No. 213,676.

*To all whom it may concern:*

Be it known that I, HELMER HENDRECKSON, a citizen of the United States, residing at Decorah, in the State of Iowa, have invented certain new and useful Improvements in Separating and Threshing Appliances, of which the following is a specification.

This invention relates to improvements in grain-separators and threshing-machines.

The object of the invention is to provide specific and novel mechanism between the straw-pans to toss, and thus separate, the straw to facilitate the threshing action. To this end it is my purpose to pivot the tossing-pan at one end and connect its outer end to one of the straw-pans to impart a quick and sudden throw of the straw to scatter it just as it leaves the straw-pan in the forward part of the machine.

Many other objects and advantages will be hereinafter referred to and be particularly pointed out in the claims.

I have represented in the drawing a side elevation of my improvement stripped of its supporting-frame, the movement of the toss-pan, and the straw-pan with which it is connected being shown in dotted lines.

1 represents a straw-pan on which the straw is received, 2 and 3 being the hangers supporting the pan. The hanger 2 is pivoted at 4 and the hanger 3 at 5. A pitman 6 is connected to the lower end of the hanger 2, and it may be operated in any desired manner. Located under the straw-pan is a grain-pan 7; but as this feature, as well as those above referred to, is not new with me it is not deemed necessary to further describe them.

Located approximately under the rear end of the straw-pan 1 is a bar 8, on which is pivoted a toss-pan 9, comprising a frame and cross-bars bearing projections 11. The toss-pan inclines downwardly from the straw-pan, and pivotally fastened to its lower end is the front end of a second straw-pan or tailer. The rear end of the tailer is supported on arms 12, pivoted at 13 and connected at the lower ends to the grain-pan 14, the latter being mounted at its front end on a hanger 15. Arm 16 depends from the bar 8, and a pitman 17 is connected to it to impart motion to the toss-pan, tailer, and grain-pan.

The straw-pan 1 is so mounted that the grain is tossed higher at its front end than at the rear, the purpose of which is to spread the grain and give it a good shaking immediately it is received on the straw-pan, and as it nears the rear end the grain will be gradually and evenly shaken from the straw. This action is also true of the tailer. It will be observed by reference to the drawing that the straw at the forward end of the tailer is thrown higher than at the rear end of the tailer and that the toss-pan forms a continuation of said tailer and yet imparts to the straw a motion quite distinct from that given by the tailer.

By the time the straw reaches the rear end of the straw-pan 1 it has somewhat settled down, and immediately it is delivered onto the toss-pan the sudden motion of the latter throws it upwardly and rearwardly and spreads it out. The straw falls on the tailer and is again shaken and spread out and is gradually worked upward to the rear end. The straw being thinned out and shaken, the grain will be readily separated, when it will fall to the grain-pan and be directed to the appropriate mechanism on the thresher.

The advantages incident to the peculiar movement of the toss-pan and tailer are well known, and it does not appear necessary to go into them in detail.

I am aware toss-pans have been employed between the straw-pan and tailer in a threshing-machine; but all such contrivances known to me are defective either in construction or operation. I have sought to overcome these difficulties by making the toss-pan a continuation of the tailer and yet permit the individuality of the movement of the two parts. Such a construction produces a positive action and a durable and cheap machine.

What I claim as new is—

1. In combination, a straw-pan, a tailer, a toss-pan pivoted at one end under one end of the straw-pan and its opposite end pivotally connected to the tailer, a pivotal support for the opposite end of the tailer, the support being such that the throw at the joint between the toss-pan and tailer will be greater than at the support, and means for operating the toss-pan and tailer, substantially as described.

2. In combination, a straw-pan, hangers for supporting said pan, said hangers being mounted to throw the pan higher at one end than at the other, a toss-pan pivoted at one end next the straw-pan, a tailer mounted at one end on a pivotal support and pivotally connected at its opposite end to the toss-pan, the toss-pan throwing the grain up while the tailer throws it up and at the same time moves it rearwardly, and means for operating the toss-pan and tailer, substantially as described.

3. In combination, a straw-pan, a tailer, a toss-pan pivoted at one end adjacent the straw-pan and at its opposite end pivotally connected to the tailer, pivotally-mounted hangers for supporting the opposite end of the tailer, and mechanism connected to the toss-pan for operating the toss-pan and tailer, the mounting of the toss-pan and tailer being such that the adjacent ends of the toss-pan and tailer are thrown a greater distance upwardly than their ends, substantially as described.

In testimony whereof I have signed my name to this specification in presence of two witnesses.

HELMER HENDRECKSON.

Witnesses:
GEO. W. ADAMS,
ROSE HEINBERG.